US008281607B2

(12) United States Patent　(10) Patent No.: US 8,281,607 B2
Dolin　(45) Date of Patent: Oct. 9, 2012

(54) ELECTRONIC BLOCK VALVE

(75) Inventor: Brian J. Dolin, St. Louis, MO (US)

(73) Assignee: Parker-Hannifin Corporation, Cleveland, OH (US)

(*) Notice: Subject to any disclaimer, the term of this patent is extended or adjusted under 35 U.S.C. 154(b) by 812 days.

(21) Appl. No.: 12/295,488

(22) PCT Filed: Apr. 2, 2007

(86) PCT No.: PCT/US2007/065777
§ 371 (c)(1), (2), (4) Date: May 18, 2009

(87) PCT Pub. No.: WO2007/130769
PCT Pub. Date: Nov. 15, 2007

(65) Prior Publication Data
US 2010/0031681 A1　Feb. 11, 2010

Related U.S. Application Data

(60) Provisional application No. 60/788,408, filed on Mar. 31, 2006.

(51) Int. Cl.
 *F25B 41/04* (2006.01)
 *F25B 41/00* (2006.01)
(52) U.S. Cl. .............. 62/225; 62/210; 62/212; 62/224
(58) Field of Classification Search .............. 62/225, 62/212, 224, 210, 181, 184; 236/92 B; 251/129.01, 251/129.15; 700/282
See application file for complete search history.

(56) References Cited

U.S. PATENT DOCUMENTS

| | | | |
|---|---|---|---|
| 4,593,881 A | 6/1986 | Yoshino | |
| 4,677,830 A | 7/1987 | Sumikawa et al. | |
| 4,848,100 A * | 7/1989 | Barthel et al. | 62/212 |
| 5,261,483 A | 11/1993 | Imaoka | |
| 5,295,360 A | 3/1994 | Olds et al. | |
| 5,605,318 A | 2/1997 | Malone et al. | |
| 5,941,084 A | 8/1999 | Sumida et al. | |
| 6,375,086 B1 | 4/2002 | Babin et al. | |
| 2003/0055603 A1 | 3/2003 | Rossi et al. | |

FOREIGN PATENT DOCUMENTS

| | | |
|---|---|---|
| EP | 0 276 491 | 8/1988 |
| EP | 0 339 339 | 11/1989 |
| EP | 0 539 944 | 5/1993 |
| EP | 0 678 717 | 10/1995 |

(Continued)

OTHER PUBLICATIONS

International Search Report for corresponding Application No. PCT/US2007/065777 dated Jan. 3, 2008.

(Continued)

*Primary Examiner* — Chen Wen Jiang
(74) *Attorney, Agent, or Firm* — Renner, Otto, Boisselle & Sklar, LLP

(57) ABSTRACT

An electrically controlled expansion valve package (10) comprises an expansion valve (30), sensors (32, 33, 36) and control electronics (35) all included in a monolithic package that greatly simplifies installation, while also enabling performance enhancements. The expansion valve is controlled by control electronics that, among other things, determines from pressure and temperature sensors the type or nature of the refrigerant being used in the refrigeration system for adapting control of the expansion valve to the refrigerant.

11 Claims, 2 Drawing Sheets

FOREIGN PATENT DOCUMENTS

| | | |
|---|---|---|
| EP | 1 416 235 | 5/2004 |
| EP | 1 536 193 | 6/2005 |
| JP | 07 253250 | 10/1995 |
| JP | 07253250 A * | 10/1995 |
| JP | 10 325652 | 12/1998 |
| JP | 2005-315550 | 11/2005 |
| JP | 2005315550 A * | 11/2005 |

OTHER PUBLICATIONS

International Preliminary Report on Patentability for corresponding Application No. PCT/US2007/065777 dated Oct. 21, 2008.

* cited by examiner

ELECTRONIC BLOCK VALVE

RELATED APPLICATIONS

This application is a national phase of International Application No. PCT/US07/65777 filed Apr. 2, 2007 and published in the English language, which claims the benefit of U.S. Provisional Application No. 60/788,408 filed Mar. 31, 2006.

FIELD OF THE INVENTION

The present invention relates to refrigeration systems employing expansion valves.

BACKGROUND OF THE INVENTION

A typical refrigeration system comprises at least one evaporator contained within the space that is to be cooled, a condenser that is located outside of the cooled space, a compressor positioned between the evaporator outlet and the condenser inlet, and an expansion valve. A refrigerant circulating through the system is compressed by the compressor which raises the temperature and pressure of the refrigerant. The then hot pressurized refrigerant gas flows through the condenser which serves as heat exchanger to allow the refrigerant to dissipate heat. The refrigerant condenses into a liquid and then flows through the expansion valve, where the liquid refrigerant moves from a high pressure zone into a low pressure zone, thus expanding and evaporating, and thereby becoming cold. The cold refrigerant passes into coils of the evaporator, thus absorbing heat from inside the space that is to be cooled. The evaporator could be located, for example, in the plenum of a forced air residential or commercial air conditioning system through which air is blown for cooling the interior of the residence or building. Other applications include automotive air conditioning systems and commercial food storage units.

A commonly used expansion valve for controlling flow of the compressed and liquified refrigerant from the condenser to the evaporator is a thermostatic expansion valve (TEV). Thermostatic expansion valves have employed a liquid-filled capsule sensing the temperature of the refrigerant discharging from the evaporator. Expansion of the fluid in the chamber operates a pressure responsive moveable valve member for controlling the liquid refrigerant flow through the valve. Such diaphragm actuated thermal expansion valves are often used in automotive air conditioning systems for controlling refrigerant flow where rapid changes in operating conditions require a high degree of responsiveness by the valve.

Many if not all conventional thermostatic expansion valves cannot meet the higher efficiency standards (SEER seasonal efficiency ratio) being set by law in some jurisdictions, such as the United States. In addition, manufacturers needed to stock a large number of different valves for use with different sizes and refrigerant types. Another drawback is the mounting of the valve components, in particular the pressure sensing tubes and temperature sensing bulb, can be cumbersome. Also, additional test equipment and job site visits often is necessary for troubleshooting the valves.

Several types of electrically actuated expansion valves also are known. One type includes a solenoid connected to an appropriate electrical supply which, in response to a pulsed electrical signal, actuates a plunger or control element alternately into and out of a flow path through an expansion valve body to permit or prevent fluid flow. Another type of electrically actuated expansion valve has a rotary actuator with a mechanism for converting the rotary motion into linear motion for operating a valve element to increase or decrease the flow area available through the valve body by seating against the valve seat to close the valve and prevent flow, or, moving linearly away from the valve seat, to permit flow through an area defined by the area of the opening between the valve element and the valve seat.

While electrically actuated valves overcome some of the drawbacks associated with thermostatic expansion valves, problems still exist. For instance, current electronic systems require the valve, sensors and electronics to be hard-wired and individually installed at the installation site.

SUMMARY OF THE INVENTION

The present invention provides a novel expansion valve package that overcomes one or more of the drawbacks associated with prior art expansion valves. According to one aspect of the invention, an expansion valve, sensors and control electronics are all included in a monolithic package that greatly simplifies installation, while also enabling performance enhancements. According to another aspect of the invention, an expansion valve is controlled by control electronics that determines from pressure and temperature sensors the type or nature of the refrigerant being used in the refrigeration system for adapting control of the expansion valve to the refrigerant. That is, the controller has a learning mode that determines the nature or type of refrigerant being used.

Accordingly, one aspect of the invention provides an electronic valve assembly for controlling the flow of a refrigerant through an evaporator. The valve assembly comprises a valve body having a supply/liquid passage connecting inlet and outlet ports and a return/suction passage connecting inlet and outlet ports; an electrically actuated expansion valve mounted to the valve body for controlling flow of refrigerant through the supply passage; at least one pressure sensor mounted to the valve body and positioned to sense fluid pressure in the suction passage; at least one temperature sensor mounted to the valve body and positioned to sense the temperature of fluid in the suction passage; and onboard electronics mounted to the valve body for controlling the expansion valve in response to pressure and temperature signals received from the pressure and temperature sensors.

According to another aspect of the invention, an expansion valve apparatus comprises an electrically controlled valve for controlling flow of refrigerant through a supply line; at least one pressure sensor for sensing fluid pressure in a suction line, at least one temperature sensor for sensing fluid temperature in the suction line, and electronics for controlling the expansion valve in response to pressure and temperature signals received from the pressure and temperature sensors, the electronics including different control parameters for controlling the expansion valve for respective types of refrigerants, and a learning routine for determining which control parameters to use from an analysis of the pressure and temperature signals received from the pressure and temperature sensors.

The expansion valve may be a cartridge expansion valve threaded into a threaded bore in the valve body.

The electronics may include a processor programmed to provide one or more of pressure/temperature superheat control, two temperature superheat control, and subcooling control.

The electronics may provide for fault detection and/or diagnostics.

The electronics may be provided with a communications interface for providing system and/or performance information to an external device.

The electronics may include a memory for storing preset parameters that can be reset in the field.

The electronics may be operative to adjust operating parameters as a function of the sensor outputs so as to adapt the valve to different types of refrigerants.

Further features of the invention will become apparent from the following detailed description when considered in conjunction with the drawings.

DETAILED DESCRIPTION

Figure 1:
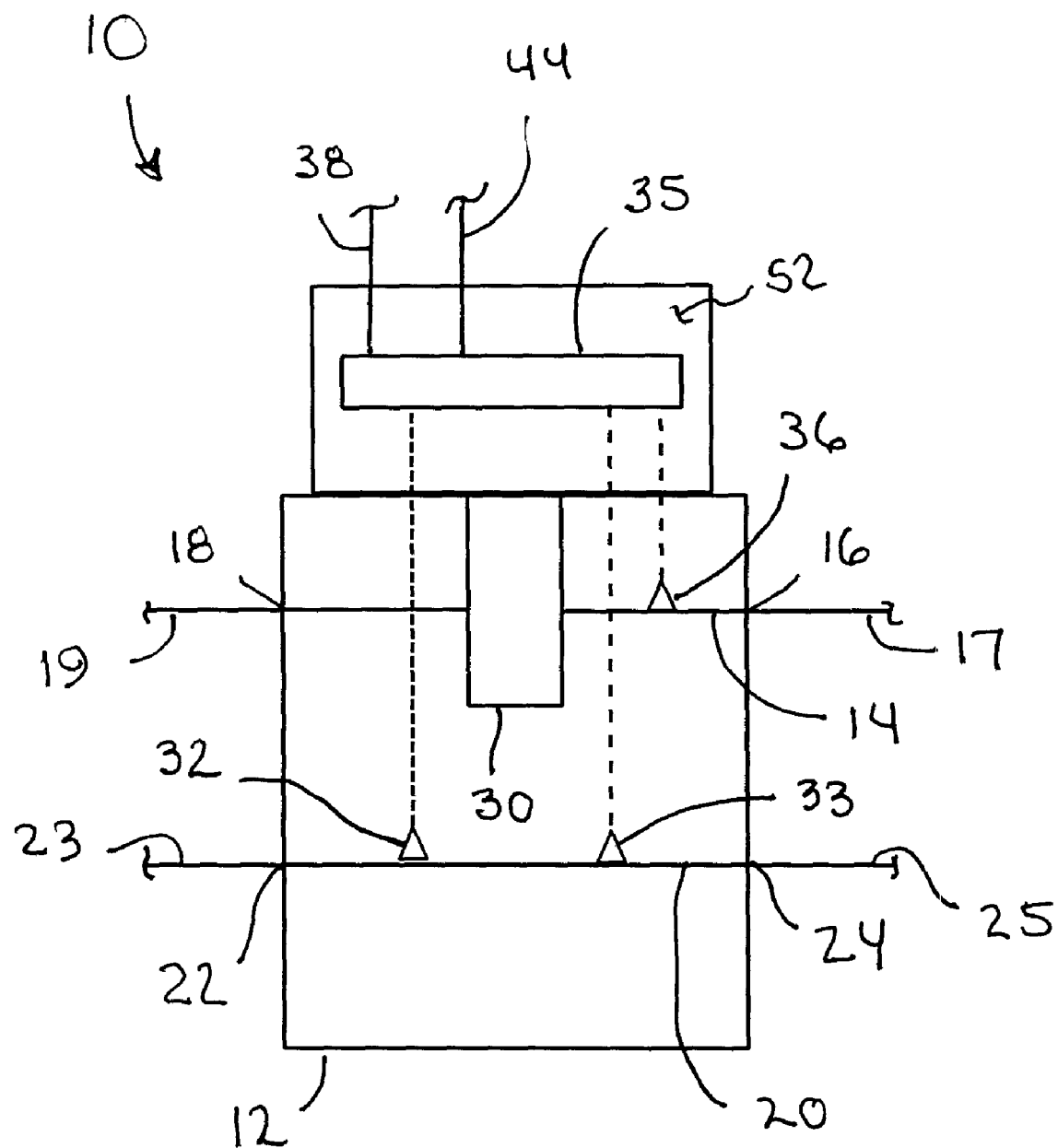
FIG. 1 is a schematic diagram of an exemplary electronic valve assembly according to the invention.

Referring now to the drawings in detail and initially to FIG. 1, an exemplary electronic valve assembly (also herein referred to as an electronic block valve) according to the invention is diagrammatically illustrated and designated generally by reference numeral 10. The valve assembly (or block valve) 10 can be used in a variety of air conditioning, heat pump, supermarket case and other refrigeration systems for controlling the flow of a refrigerant from a compressor/condenser to and through an evaporator.

The block valve 10 comprises a valve body 12 having a liquid or supply passage 14 connecting inlet and outlet ports 16 and 18, and a suction or return passage 20 connecting inlet and outlet ports 22 and 24. The inlet port 16 provides for connection of the block valve to a liquid flow line 17 extending from the outlet of a condenser. The outlet port 18 provides for connection of the block valve to a line 19 connected to the inlet of an evaporator. The inlet port 22 provides for connection to a gas line 23 connected to the outlet of the evaporator and the outlet port 24 provides for connection of the block valve to a line 25 connected to the inlet of the compressor (the inlet and outlet ports 22 and 24 can be reversely connected to the lines 23 and 25 if desired).

The block valve 10 further comprises an electrically actuated expansion valve 30 mounted to the valve body 12 for controlling flow of refrigerant through the supply passage 14, i.e. flow from the inlet port 16 to the outlet port 18. The expansion valve may be of any suitable type. For example, the expansion valve may be a solenoid operated cartridge expansion valve threaded into or otherwise secured in a bore in the valve body 12.

The block valve also comprises a pressure sensor 32 mounted to the valve body and positioned to sense fluid pressure in the suction passage 20, and a temperature sensor 33 mounted to the valve body and positioned to sense the temperature of fluid in the suction passage 20. The block valve may further comprise additional pressure and temperature sensors as needed to provide inputs to electronics 35 that control operation of the expansion valve 30 as discussed below in greater detail. For example, a temperature sensor 36 is provided to sense the temperature of fluid in the inlet portion of supply passage 14 connecting the inlet port 16 to the expansion valve.

The electronics 35 are mounted to the valve body 12. The electronics typically will include a suitably programmed processor and associated input and output circuits for interfacing with the sensors and the expansion valve for controlling the expansion valve in response to pressure and temperature signals received from the pressure and temperature sensors. That is, the onboard electronics interpret the sensed data and output control signals to the expansion valve operator, be it a solenoid, rotary motor, thermal actuator, etc.

The use of onboard electronics and sensors provides for excellent performance and high efficiency. The electronics 35, more particularly the processor thereof, can be programmed to provide pressure/temperature superheat control, two temperature superheat control, subcooling control or other functionality. This will provide an electronic expansion valve package at a reasonable cost that can result in higher efficiency AC and other refrigeration units.

The electronics may also provide for fault detection and/or diagnostics. For example, the electronics may be programmed based on sensor inputs to predict a failure before it happens, thereby reducing expense and/or downtime. If desired, a visual output of the status and/or fault condition can be provided, such as by one or more LEDs or another display component mounted to the body 12.

The electronics may also be provided with a communications interfaces for providing system and performance information locally to a tool or remotely to a network, telephone, IM or the Internet. To this end, the electronics may be provided with a connector or leads 44 for enabling communication to one or more external devices, and/or such communication can be effected wirelessly using conventional wireless communication means, such as a wireless LAN. Communication also enables the block valve to be linked to the overall system control, such as a controller in a residential air conditioning or heat pump system, for providing total comfort control through the linking of all HVAC components together through smart components, such as the block valve, thermostat and condensing unit. Also enabled is the ability to alert a homeowner, maintenance personnel or a contractor of problems, such as by transmitting an alert signal and/or other information, e.g. status information, to an external display conveniently located for access by a technician or a homeowner. In one particular embodiment, the communication component of the electronics can be Internet enabled for communicating, for example, with a remotely located monitoring station. In addition, the expansion valve may have preset parameters that can be reset in the field if desired, such as if the system is changed over to a different refrigerant or another system component is replaced in the field.

The electronics 35 may also be configured to control the flow of refrigerant to the evaporator under a wide range of load conditions. In addition, the electronics may "learn" learn what refrigerant it is being used by comparing pressure and temperature relationships in the system to those corresponding to a given refrigerant. The electronics can then adjust (self-configure) the operating parameters to the sensed refrigerant type for optimal control of the expansion valve. As a result of these features, a single block valve can be provided to accommodate a number of different variables such as system size, load requirements, different refrigerants, etc.

Although the electronics 35 may be powered by an onboard battery for some applications, usually the electronics will receive power via power leads 38 connected to a remote power source. For example, 24 volt power may supplied from a transformer typically provided to supply power to other components of a heating and ventilation system, such as the overall system controller.

As will be appreciated, the expansion valve, sensors and electronics are all included in a single monolithic unitary package that greatly facilitates quick and easy installation. In a typical configuration, only power wires 38 have to be connected in addition to the connection of the package to the flow lines 17, 19, 23 and 25. A further connection 44 may be needed if wired communication is provided.

The ports to which the flow lines 17, 19, 23 and 25 connect may be suitably configured to provide for quick connection and/or disconnection. The connections may be brazed, mechanical or compression type. Another common type is a "banjo" type connection commonly used in automotive applications. Quick connects devices are also contemplated.

The electrical connections between the sensors 32, 33 and 36 and the electronics 35, which may include a printed circuit board to which sensor leads are connected, may be routed in any suitable manner such as through passages in the body 12. The body may be a unitary body or composed of one or more pieces to facilitate manufacture. The electronics 35 in whole or in part may be encapsulated in a suitable encapsulation material 52 that may be attached, as by bonding or molding, to the body 12.

Figure 2:
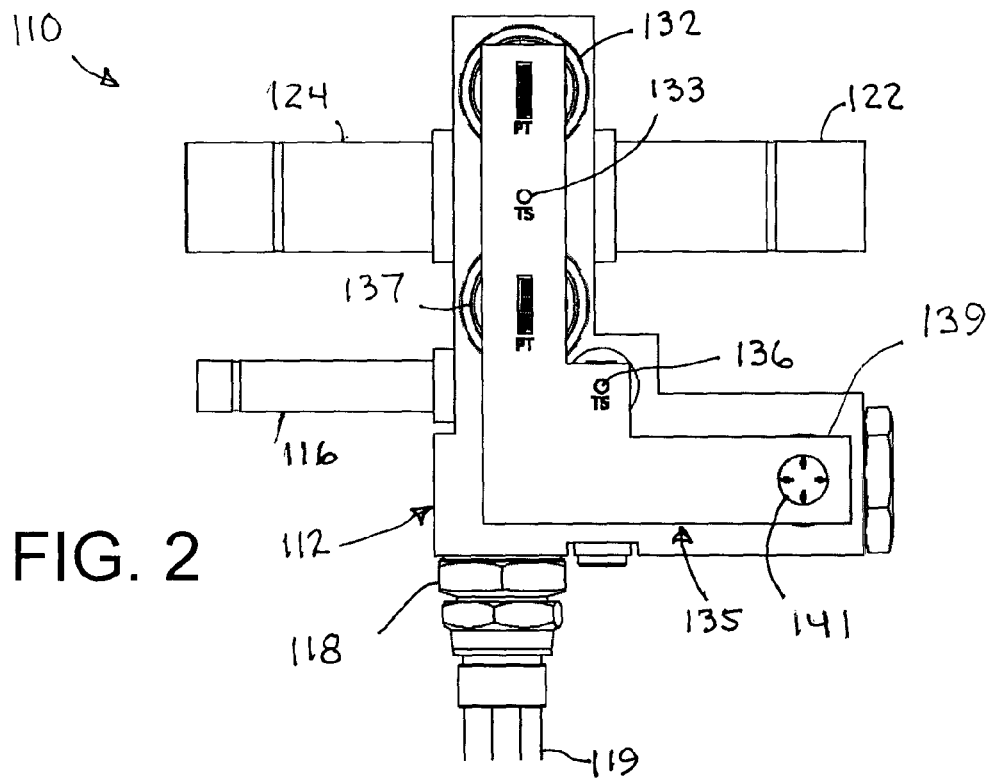
FIG. 2 is a side elevational view of an exemplary physical embodiment of the electronic valve assembly.
Figure 3:
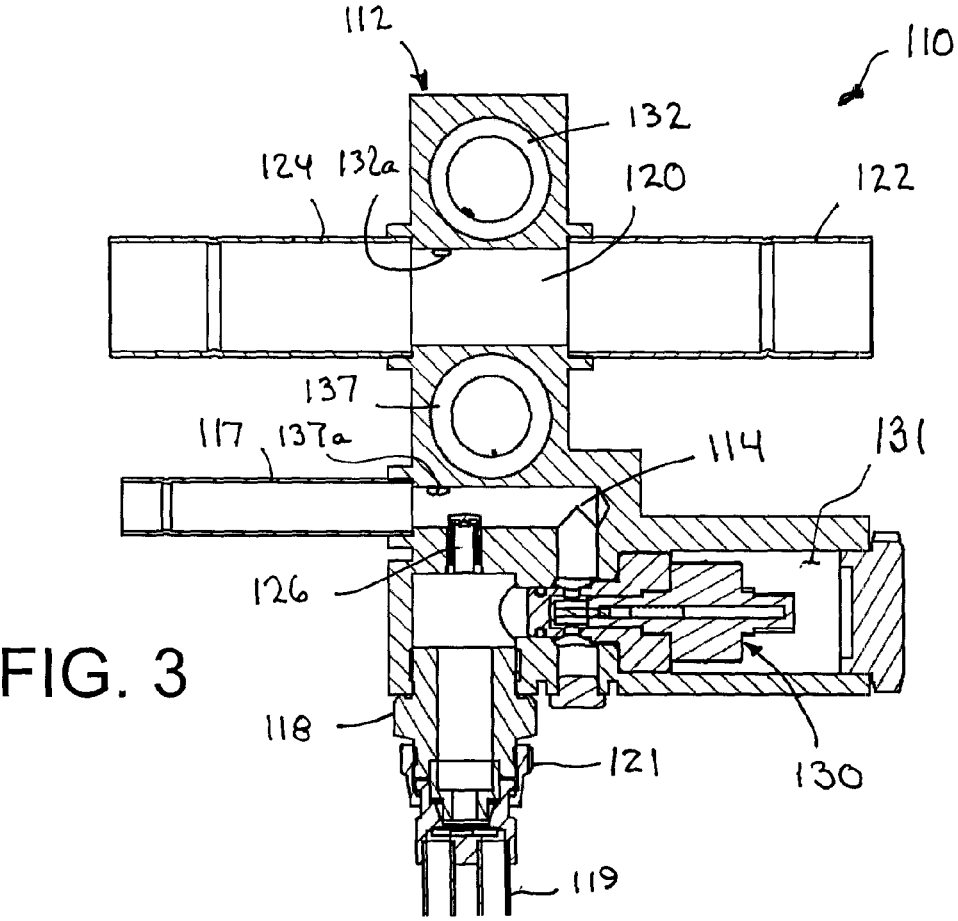
FIG. 3 is a cross-sectional view of the electronic valve assembly of FIG. 2.

Referring now to FIGS. 2 and 3, an exemplary implementation of principles of the invention is illustrated by way of electronic block valve 110. The valve 110 has particular application in a residential air conditioning system for controlling the flow of a refrigerant from a compressor/condenser to and through an evaporator. Parts corresponding to those described above in connection with the valve 10 of FIG. 1 are designated by the same number incremented by 100.

The block valve 110 comprises a valve body 112 having a liquid or supply passage 114 connecting inlet and outlet ports 116 and 118, and a suction or return passage 120 connecting inlet and outlet ports 122 and 124. The inlet port 116, inlet port 122 and outlet port 124 are for example configured for solder connection to respective flow tubes whereas the outlet port 118 is equipped for example with a tube fitting 121 for connection to a tube that is connected to the inlet of an evaporator. The block valve may also include a check valve 126 in a bypass passage extending between the inlet and outlet portions of the passage 114 on respective sides of the expansion valve, thereby to enable reverse flow without passage through the expansion valve, as to enable use of the block valve in a heat pump system.

The block valve 110 further comprises an electrically actuated, cartridge-type expansion valve 130 for controlling flow of refrigerant through the supply passage 114. The valve 130 may be threaded into the valve body 112 or may be housed within a chamber 131 in the valve body 112 as shown. The block valve also comprises a pressure sensor 132 mounted to the valve body and positioned to sense fluid pressure in the suction passage 120, and a temperature sensor 133 mounted to the valve body and positioned to sense the temperature of fluid in the suction passage 120. The block valve may further comprise additional pressure and temperature sensors as needed to provide inputs to electronics 135 that control operation of the expansion valve 130 as discussed below in greater detail. For example, a temperature sensor 136 is provided to sense the temperature of fluid in the inlet portion of supply passage 114 connecting the inlet port 116 to the expansion valve, and a pressure sensor 137 is provided to sense the pressure in the inlet portion of the supply passage 114. In FIG. 3 branch passages 132*a* and 137*a* communicate the pressure sensors with the respective flow passages 120 and 114.

As shown, the electronics 135 include a printed circuit board 139 that is mounted to the valve body 112. The circuit board may be provided with electrical leads or connectors for connecting to the sensors 132, 133, 136 and 137. The connectors may be strategically placed on the circuit board for mating with terminals on the sensors. The board also is provided with a glass feed-through 141 for connecting with the motor, such as a step motor, of the expansion valve 130.

The onboard electronics 135 receives power by leads (not shown) which may also include leads for communication to external devices. The circuit board may be encapsulated in a suitable insulating encapsulating material (not shown) that may be bonded or otherwise held to the valve body.

The expansion valve, sensors and electronics accordingly are all included in a single monolithic unitary package that greatly facilitates quick and easy installation. In a typical configuration, only power wires have to be connected in addition to the connection of the package to the flow lines as above discussed.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electronic valve (10) for controlling the flow of a refrigerant through an evaporator, comprising:
   a valve body (12) having a supply passage (14) connecting inlet and outlet ports (16, 18) and a return passage connecting inlet and outlet ports ( );
   an electrically actuated expansion valve (30) mounted to the valve body for controlling flow of refrigerant through the supply passage;
   at least one pressure sensor (32) mounted to the valve body and positioned to sense fluid pressure in the return passage;
   at least one temperature sensor (33) mounted to the valve body and positioned to sense the temperature of fluid in the return passage;
   a temperature sensor (36) mounted to the valve body and positioned to sense the temperature of fluid in the supply passage; and
   onboard electronics (25) mounted to the valve body for controlling the expansion valve in response to pressure and temperature signals received from the pressure and temperature sensors, the onboard electronics being configured to adjust operating parameters as a function of the sensor outputs so as to adapt the valve to different types of refrigerants.

2. A valve according to claim 1, wherein expansion valve (30) is a cartridge expansion valve threaded into a threaded bore in the valve body.

3. A valve according to claim 1, wherein the electronics 25 include a processor programmed to provide one or more of pressure/temperature superheat control, two temperature superheat control, and subcooling control.

4. A valve according to claim 1, wherein the electronics provide for fault detection and/or diagnostics.

5. A valve according to claim 1, wherein the electronics is provided with a communications interface for providing system and/or performance information to an external device.

6. A valve according to claim 1, wherein the electronics include a memory for storing preset parameters that can be reset in the field.

7. An expansion valve apparatus (10) comprising an electrically controlled valve (30) for controlling flow of refrigerant through a supply line;

at least one pressure sensor (32) for sensing fluid pressure in a suction line, at least one temperature sensor (33) for sensing fluid temperature in the suction line, a temperature sensor mounted to the valve body and positioned to sense the temperature of fluid in the supply passage, and electronics (25) for controlling the expansion valve in response to pressure and temperature signals received from the pressure and temperature sensors, the electronics including different control parameters for controlling the expansion valve for respective types of refrigerants, and a learning routine for determining which control parameters to use from an analysis of the pressure and temperature signals received from the pressure and temperature sensors.

8. A valve apparatus according to claim 7, wherein the electronics 25 include a processor programmed to provide one or more of pressure/-temperature superheat control, two temperature superheat control, and subcooling control.

9. A valve apparatus according to claim 7, wherein the electronics provide for fault detection and/or diagnostics.

10. A valve apparatus according to claim 7, wherein the electronics is provided with a communications interface for providing system and/or performance information to an external device.

11. A valve apparatus according to claim 7, wherein the electronics include a memory for storing preset parameters that can be reset in the field.

* * * * *